Joseph C. Bysarovich
INVENTOR.

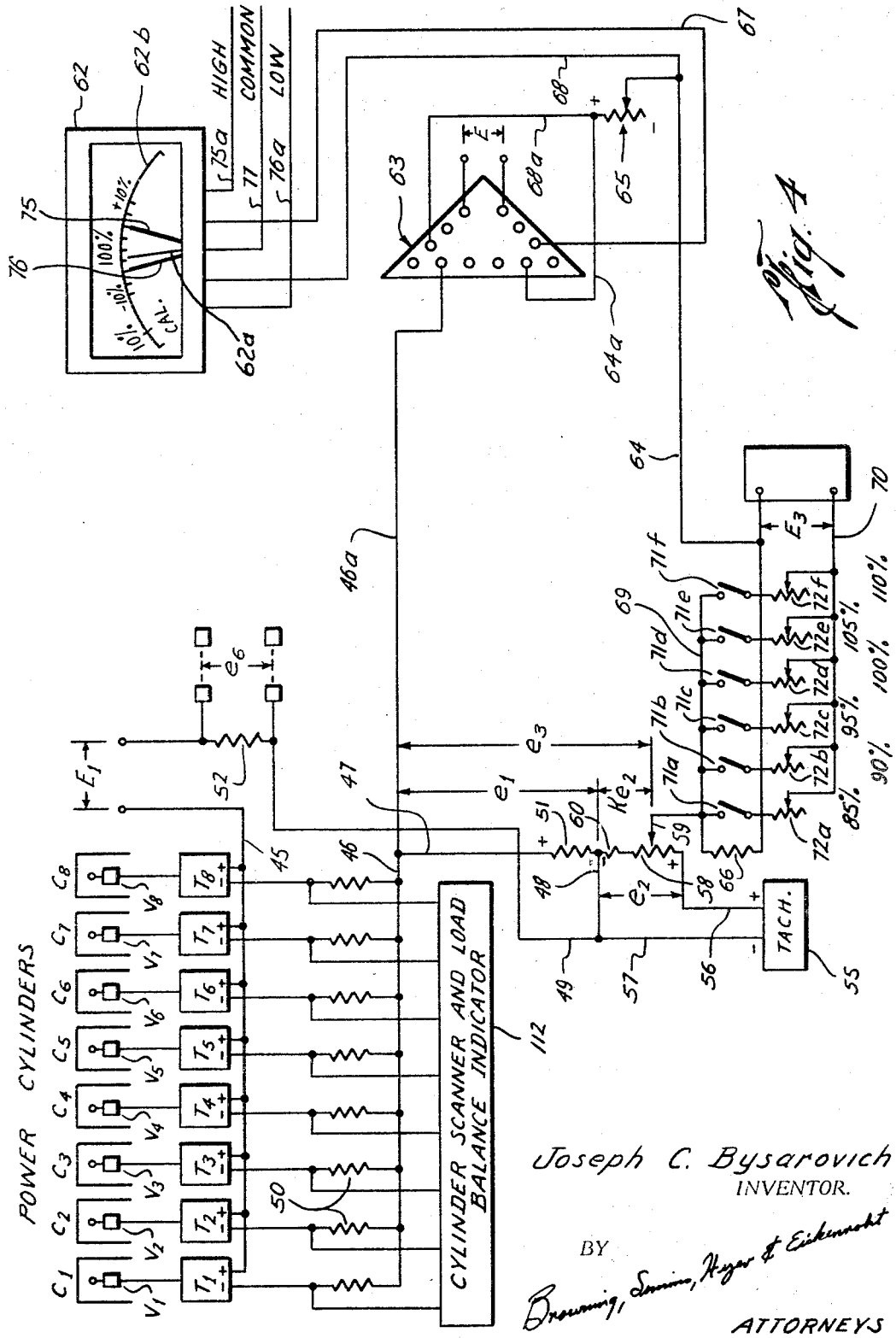

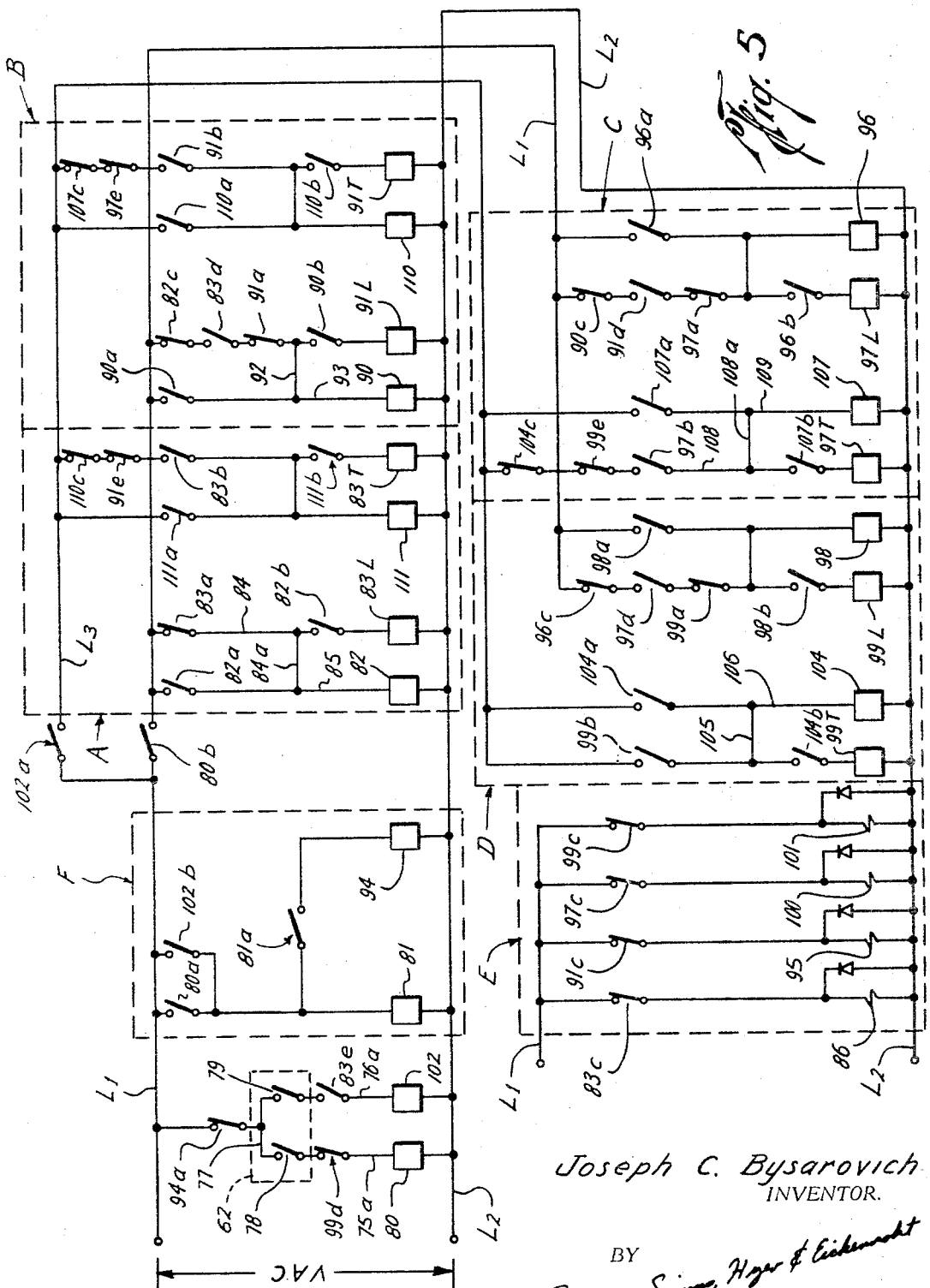

United States Patent Office 3,444,730
Patented May 20, 1969

3,444,730
METHOD AND APPARATUS FOR INDICATING AND CONTROLLING THE TORQUE ON AN INTERNAL COMBUSTION ENGINE
Joseph C. Bysarovich, Houston, Tex., assignor to Dresser Industries, Inc., Dallas, Tex.
Continuation of application Ser. No. 415,536, Dec. 2, 1964. This application Oct. 12, 1967, Ser. No. 675,002
Int. Cl. G01m 15/00
U.S. Cl. 73—115                                    16 Claims

ABSTRACT OF THE DISCLOSURE

The apparatus includes elongated conduits connected to each engine power cylinder, each defining a chamber connected to the cylinder through a flow restricting device. The flow restricting device levels out the substantial pressure changes within the cylinder to produce a relatively level pressure within the associated conduit chamber which is related to the mean time pressure of the cylinder. Transducers communicating with each chamber produce individual electrical signals related to the mean time pressure of each cylinder which may be individually monitored. These signals are combined to produce an electric signal related to the mean time pressure of the engine. An electric signal responsive to engine speed is producd by means of a tachometer generator. The mean time pressure signal and the speed signal are combined electrically to produce a signal which is related to the mean effective pressure, and therefore the torque, of the engine. The torque signal is fed to a meter relay which, in conjunction with a stepping circuit, varies the load on the engine driving a compressor by serially opening or closing cylinder clearance pockets.

---

This application is a continuation of application Ser. No. 415,536, filed Dec. 2, 1964, now abandoned.

This invention relates in general to a method and apparatus for improving the performance of an internal combustion engine and refers more particularly to such a method and apparatus that will indicate the torque applied to the drive shaft by the engine and may be utilized to control the magnitude of such torque during operation of the engine by varying the driven load in response to such indicated torque.

The structural parts of an internal combustion engine are designed by the manufacturer for operation at a given engine torque—usually called "rated" torque. If the engine is operated above its rated torque its structural parts are subjected to stresses above those for which they are designed. This shortens the service life of the engine. If it is operated far below its rated torque, its operating life is not shortened, but it is not producing the power to justify the investment in that size of engine.

Therefore, it is desirable to determine the actual torque which an engine is experiencing to allow adjustments to be made, if possible, to bring its actual torque as close as possible to that desired for the engine.

Various ways have been used, heretofore, to determine the actual torque on an engine. The most common method was to measure the work being done on the driven component and from that to calculate the torque on the engine. This method is not entirely accurate, however, because of variables such as the driven component's efficiency and the driven component's inherent complex loading characteristics.

The actual torque produced by an engine results from the pressure in each power cylinder acting against the piston therein. Thus, the pressures in the power cylinders determine the stresses that are being imposed on the structural components of the engine.

The pressure in a power cylinder varies from a maximum to a minimum during each cycle. The stroke averaged pressure acting on a piston during a power cycle is called the mean effective pressure, MEP. For a given torque, the actual MEP will be constant regardless of the speed of the engine, i.e., the actual torque produced by an engine is directly proportional to its actual MEP and is independent of the engine speed. No practical means has been developed as yet for the instantaneous direct measurement of the MEP of a power cylinder.

The average pressure in a power cylinder over a given period of time is called the mean time pressure, MTP. It varies with engine speed, however, as well as with changes in actual engine torque because it represents the mean pressure for a given period of time. Changes in engine speed then, change the number of cycles during the time period and increase or decrease the mean time pressure. Thus, the MTP is a function of both cylinder pressure and engine speed, and is not a true indication of the actual torque on the engine.

Therefore, it is an object of this invention to provide a method and apparatus for indicating the actual torque on an internal combustion engine by measuring the mean time pressure of an engine and correcting it for engine speed so as to obtain, in effect, MEP.

Another object is to provide apparatus for deriving an engine performance characteristic that is connected directly to a combustion chamber and which utilizes a length of connecting tubing both as a volume chamber and a connection to a control panel.

It is another object of this invention to provide a method and apparatus for maintaining the actual torque on an internal combustion engine in a selected range.

It is another object of this invention to provide a method and apparatus for controlling the actual torque on an internal combustion engine by controlling the lead on the engine in response to indicated actual torque on the engine.

It is another object of this invention to provide apparatus for continuously monitoring the performance of each power cylinder of an internal combustion engine and for indicating its performance.

These and other objects, advantages, and features of this invention will be apparent to those skilled in the art from a consideration of this specification and attached drawings.

In accordance with this invention, a first signal is obtained that is proportional to the mean time pressure of the engine. A second signal is obtained that is proportional to engine speed and varies in magnitude with changes in engine speed at the same rate that the first signal varies due to changes in engine speed. The first and second signals are combined so changes in magnitude of the first signal due to changes in engine speed are offset by the equal changes that occur in the magnitude of the second signal to thereby produce a third signal that is independent of engine speed. This third signal, being a function of mean effective pressure in the power cylinder of the engine, can be used to indicate the actual torque on the engine and to control the load on the engine to maintain the actual engine torque within a preselected range.

The invention will now be described in detail in connection with the embodiment thereof shown in the attached drawings, in which:

FIGURE 4 is a diagram showing the apparatus schematically for correcting MTP for engine speed to indicate the actual torque on the engine; and FIGURE 5 is an electrical circuit diagram illustrating one control system for varying the load in response to actual torque on the engine as indicated by changes in the signal provided by the apparatus shown in FIGURE 4.

Figure 1:
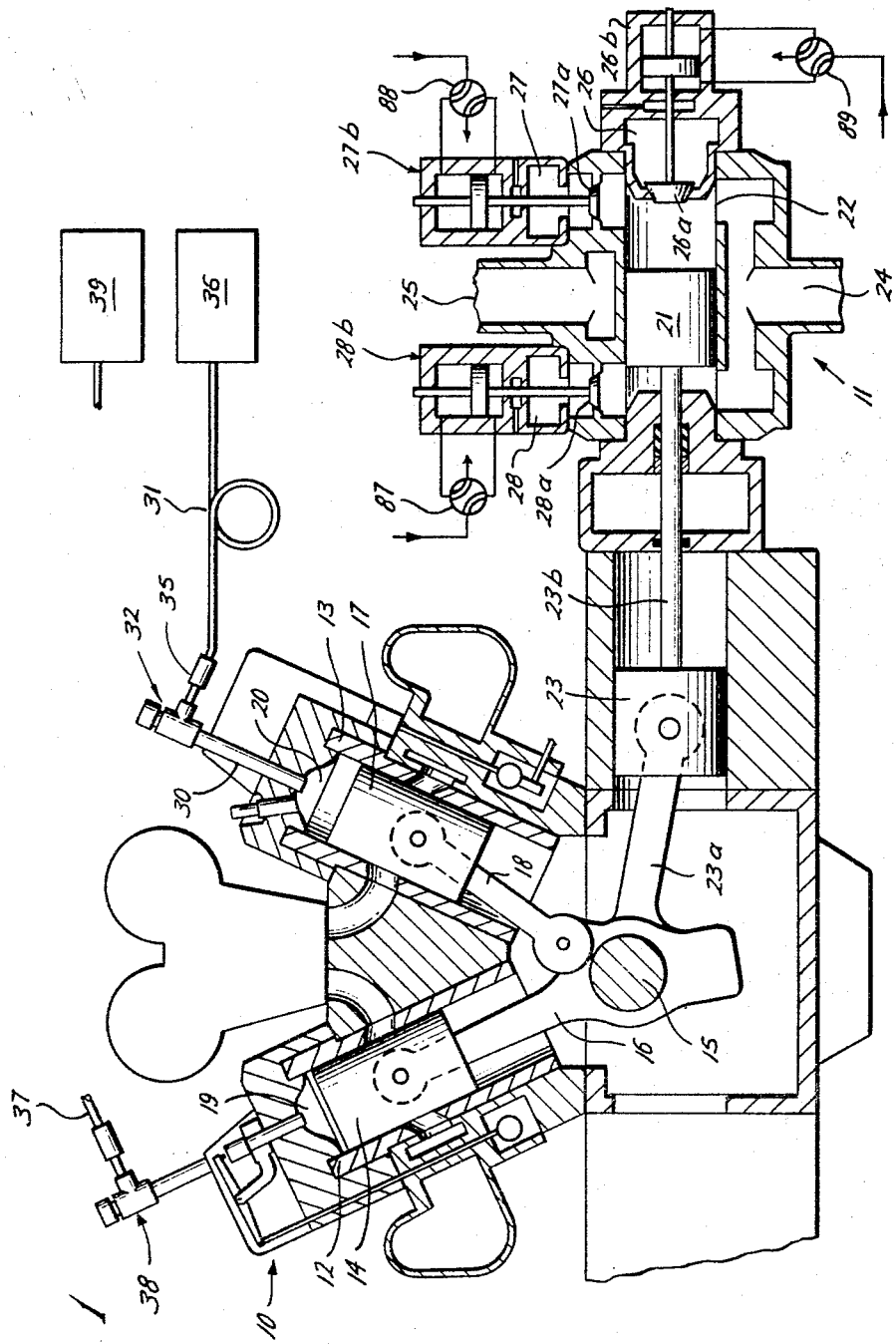
FIGURE 1 is a sectional view through an engine-compressor assembly illustrating indicating and control apparatus connected thereto and embodying this invention.

This invention has utility whenever it is desirable to know the actual torque on an internal combustion engine. It has particular utility, however, in engines that operate continuously, such as the engines which drive compressors that pump gas through a pipeline. Such an engine-compressor arrangement is shown in FIGURE 1, where internal combustion engine 10 is arranged to drive compressor 11. The engine usually includes a plurality of power cylinders, such as cylinders 12 and 13 shown in the drawings, with pistons 14 and 17, which reciprocate in cylinders 12 and 13, driving crankshaft 15 through connecting rods 16 and 18.

In operation, the engine pistons compress a combustible mixture of air and fuel in the combustion chambers of the cylinders located between their ends and the upper ends of the cylinders as are combustion chambers 19 and 20 in FIGURE 1. The mixture ignites, burns, and expands, providing the pressure required to push the pistons downwardly in the cylinders to rotate the crankshaft. As crankshaft 15 rotates, it reciprocates piston 21 in cylinder 22 of the compressor through cross head 23 and rods 23a and 23b. As is well known in the art, as piston 21 reciprocates it pulls gas into the cylinder from suction line 24 at one pressure and discharges gas into discharge line 25 at a higher pressure. The valves associated with the compressor for doing this are not shown. The amount of work the compressor does can be adjusted within limits by opening and closing the clearance pockets associated with cylinder 22 to change the volumetric efficiency of the compressor. In FIGURE 1, the compressor is shown equipped with a head end clearance pocket 26, a head end valve cover clearance pocket 27, and a rod end valve cover clearance pocket 28. Additional clearance pockets can be provided or fewer can be used, as desired. The clearance pockets can be connected to the compressor cylinder through valves 26a, 27a, and 28a, which are operated by double-acting power cylinders 26b, 27b and 28b.

In accordance with this invention, means are provided to produce a signal that is proportional to the mean time pressure of the engine. The mean time pressure of each power cylinder is obtained by connecting a separate volume chamber to each power cylinder and restricting the flow of fluid between the cylinder and the volume chamber. Thus, the mean time pressure of power cylinder 13 is obtained by connecting one end of nipple 30 to combustion chamber 20 of the cylinder and the other end to a volume chamber 31 through flow restricting means 32. Volume chamber 31 preferably is a length of copper tubing. This allows one end of the chamber to be connected to the combustion chamber through the flow restricting means and the other end to be connected to a control panel spaced from the engine. Also, by using such an elongated tube most of the heat produced by the combustion taking place in the cylinder is dissipated before it reaches the end of the tube spaced from the engine. This keeps the components, which are connected to this end of the volume chamber, and which are fully described below, from overheating.

Figure 2:
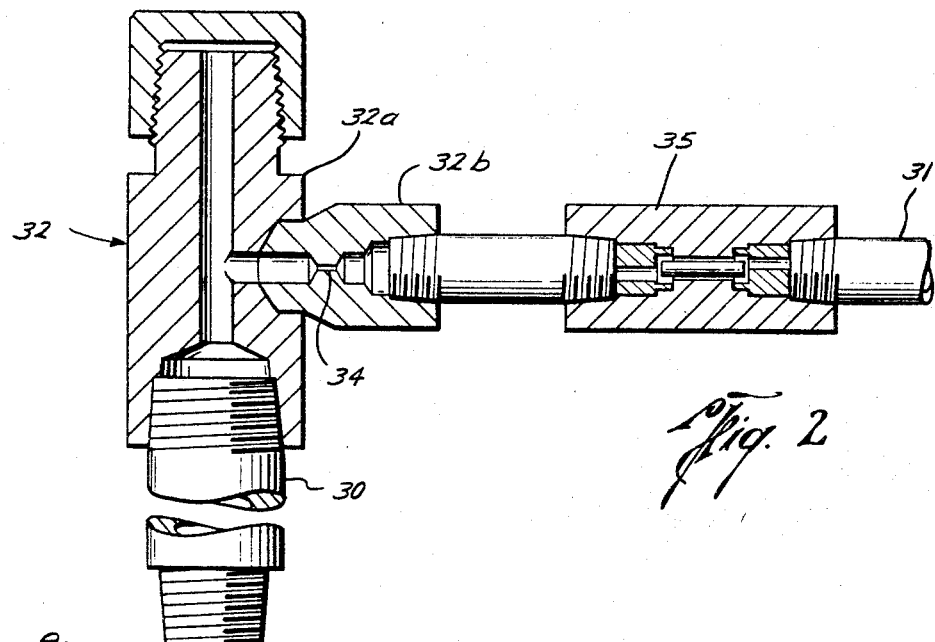
FIGURE 2 is a sectional view on an enlarged scale of one of the connections shown in FIGURE 1 of a separate volume chamber of one of the power cylinders of the engine.

The flow restricting means in the embodiment shown (FIGURE 2) comprises T 32a and orifice nipple 32b. The orifice nipple has an opening 34 therethrough of relatively small diameter through which the fluid in the combustion chamber and nipple 30 must flow to reach volume chamber 31. As the engine runs, the pressure upstream of restricted opening 34 will fluctuate as the pressure in combustion chamber 20 fluctuates. Since flow restriction 34 prevents the rapid flow of fluid into volume chamber 31, the pressure in the volume chamber will build up to some intermediate pressure between the maximum and minimum pressures which exist upstream of the flow restriction. The pressure in volume chamber 31 fluctuates as the pressure upstream of flow restriction 34 varies but to a much smaller degree because of the restriction to both forward and back flow as the upstream pressure exceeds or falls below the pressure in the volume chamber. The amount of this fluctuation will depend on the size of opening 34 and the volume of volume chamber 31. The smaller the orifice and the larger the volume chamber the less the pressure will fluctuate. The less the pressure in the volume chamber is affected by changes upstream, however, the longer it will take for the pressure in the chamber to reflect changes that occur in the pressure upstream due to changes in the torque on the engine.

To help reduce the effect of pressure surges between orifice nipple 32b and volume chamber 31, a conventional snubber 35 can be placed between opening 34 and the volume chamber. The one shown is Model No. 690, manufactured by Republic Manufacturing Co., Cleveland, Ohio.

Each power cylinder on the engine is provided with its own separate volume chamber and flow restricting means. Power cylinder 12, for example in FIGURE 1, is provided with volume chamber 37 that is connected to combustion chamber 19 of the power cylinder through flow restricting means 38. Volume chamber 37 is also made of copper tubing and flow restricting means 38 are constructed the same as flow restricting means 32 described above.

The average pressure in each volume chamber when the engine is running at a constant speed and torque, is the MTP of its associated cylinder. MTP as defined above is the average pressure over a given period of time. If the speed and/or torque of the engine changes causing a corresponding change in its MTP, the rate this change is reflected by the pressure in each volume chamber depends on the volume of each chamber and the size of the orifice through which the chamber is connected to cylinder. Therefore, preferably, all of the volume chambers have the same volume and the diameters of all of the orifices connecting the chambers to the cylinders are the same, so the pressure in each will vary with changes in speed and torque at the same rate.

To produce a signal proportional to the mean time pressure of the engine, means are associated with each volume chamber to produce a signal proportional to the pressure therein, and means are provided to combine the signals to obtain a signal proportional to the MTP of the engine. In the embodiment shown, each volume chamber is connected to a pressure transducer that produces an electrical signal having a magnitude proportional to the pressure in the chamber. Thus, as shown in FIGURE 1, volume chamber 31 is connected to transducer 36 and volume chamber 37 is connected to pressure transducer 39.

The apparatus employed in this embodiment for combining the signals from the transducers to provide a signal having a magnitude proportional to the mean time pressure of the engine is shown schematically in FIGURE 4. Assume, for example, that the engine shown in FIGURE 1 has eight power cylinders, designated $C_1$–$C_8$ in FIGURE 4, which are connected to volume chambers $V_1$–$V_8$ through flow restricting means in the manner described above. Each volume chamber, in turn, is connected to one of the transducers designated $T_1$–$T_8$. Any convenient type of pressure transducer can be used. The commercial embodiment of this invention employs Robertshaw-Microsen pressure transmitters, Type 145A–A–3, which have a pressure range from 0 to 300 p.s.i. and an output of 1 to 5 milliamperes. Transducers $T_1$–$T_8$, each of which are connected in series with a current limiting resistor 50, are connected in parallel in a circuit comprising lines 45, 46, 47, 48 and 49. The circuit is supplied with a constant DC voltage $E_1$. Located in line 47 in series with the transducers is impedance 51, which in this embodiment is a fixed resistor. The voltage drop $e_1$ across this impedance is proportional to the sum of the outputs of all of the transducers and, therefore, is proportional to the mean time pressure of the engine.

Means are provided to produce a second signal, $Ke_2$, that is proportional to the speed of the engine and that varies with speed at the same rate as does the first signal $e_1$. Means are also provided to combine this second signal $Ke_2$ with the first signal $e_1$ to produce a third signal that is proportional to the pressure in the power cylinders of the engine and, therefore, to the actual torque on the engine.

In the embodiment shown, means are provided to produce a signal $e_2$ that varies with speed at a greater rate than does the first signal and means are provided to use a portion of this signal for $Ke_2$. The signal $e_2$ is provided by tachometer 55 which is arranged to be driven by the engine to produce a signal that is proportional to the speed of the engine and that varies with changes in engine speed at a greater rate than does $e_1$. A tachometer suitable for this purpose is a Model No. 758 Weston generator combined with a Model 9906 Weston transformer.

The tachometer is connected into a circuit containing a variable impedance, which in this embodiment is potentiometer 58. Also in the circuit, which comprises lines 56, 38, and 57 is a current limiting fixed resistor 60. The voltage drop $e_2$ across these impedances varies with the speed of the engine and does so at a greater rate than does $e_1$ for the same change in engine speed. By properly setting tap 59 of the potentiometer, a portion, $Ke_2$, of signal $e_2$ can be obtained that varies with changes in engine speed at the same rate as does $e_1$. By connecting impedance 51 in the transducer circuit to the impedance in the tachometer circuit in reverse polarity, $Ke_2$ is subtracted from $e_1$ and a third signal $e_3$ is produced that is independent of engine speed.

Figure 3:
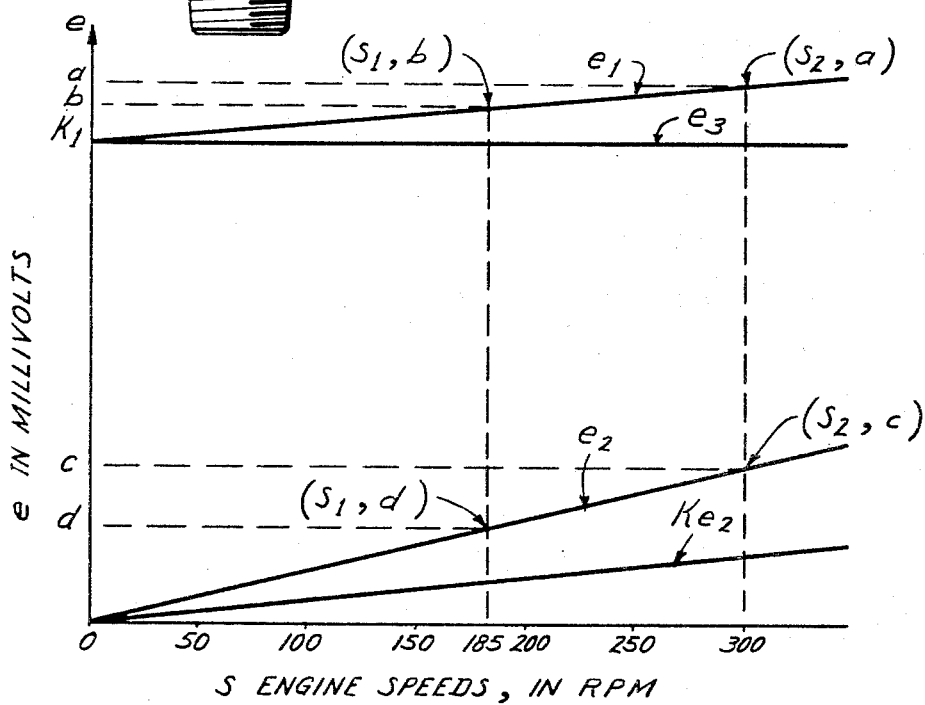
FIGURE 3 is a graph illustrating how the mean time pressure signal is corrected for speed by combining it with a signal that varies in magnitude with speed at the same rate as does the mean time pressure signal.

FIGURE 3 illustrates graphically how the two signals are combined to produce the signal $e_3$, and how the potentiometer setting can be determined.

The $e_1$ curve intersects the y-axis at $K_1$ and therefore its equation is:

$$e_1 = K_1 + \left(\frac{a-b}{S_2-S_1}\right)(S)$$

The slope of this curve, $$\frac{a-b}{S_2-S_1}$$

is determined by the volume of the volume chambers and the diameter of the orifices in the flow restricting means as explained above.

The curve for $e_2$ is shown below and its equation is:

$$e_2 = \left(\frac{c-d}{S_2-S_1}\right)(S)$$

The portion of $e_2$ that has the same rate of change with speed as does $e_1$ is the curve $Ke_2$ and its equation is:

$$Ke_2 = \frac{K(c-d)}{(S_2-S_1)}(S)$$

For the magnitude of $e_3$ to be unchanged by changes in engine speed, as shown, then the slope of $Ke_2$ must equal the slope of $e_1$, therefore:

$$\frac{K(c-d)}{S_2-S_1} = \frac{a-b}{S_2-S_1}$$

and $$K = \frac{a-b}{c-d}$$

This equation can be solved for a given engine and the proper setting for the potentiometer determined.

The potentiometer tap can also be set by running the engine at varying speeds while holding the torque constant and adjusting the tap to keep $e_3$ constant.

One method of doing this is to use a Pi-meter. Several manufacturers offer these instruments for sale. The Pi-meter measures the MTP of a power cylinder of an internal combustion engine. It is exposed to the maximum and minimum pressures existing in the combustion chamber, however, and will overheat unless it is used for only a short period of time. Further, the hot combustion gases flowing to and from the instrument tend to create hot spots in the combustion chamber that can cause the premature detonation of the fuel and air mixture in the cylinder on the compression stroke of the piston, which is another reason for limiting its time of service.

For each engine there are available conversion charts whereby the reading on the Pi-meter can be converted to engine torque. Therefore, to adjust the tap on potentiometer 58, with a Pi-meter, the engine is operated at different speeds with the load on the engine adjusted at each speed to produce the same torque on the engine, as indicated by the Pi-meter, and tap 59 is adjusted to maintain $e_3$ at the same value for each of the different engine speeds.

If the engine is driving a reciprocating piston compressor such as the one shown in FIGURE 1, there is another method available for setting tap 59. Performance charts are available for most such compressors showing the engine torque required at a given engine speed to produce an output pressure of a given value with a given suction pressure. Thus, by adjusting the suction and discharge pressures of the compressor accordingly the torque on the engine can be maintained constant at different engine speeds to allow tap 59 to be adjusted properly.

Means are provided for indicating the actual torque on the engine as represented by the magnitude of the signal $e_3$. In the embodiment shown, an indication of the actual torque on the engine is obtained by amplifying $e_3$ by amplifier 63, and connecting the output of the amplifier to current sensitive meter relay 62. An Operation Amplifier, Model No. Ma–400–60, manufactured by the Computors Division of Camco, Inc. and a Magtrak, Model 1073, Weston meter relay can be used for this purpose. The signal $e_3$ is supplied to amplifier 63 through lines 46a, 64, and 64a. The latter two lines connect tap 59 to the amplifier through a variable feed back resistor 65. The amplifier output is connected to meter relay 62 through lines 68, 68a, and 67. Lines 68a and 68 also serve to connect the variable feed back resistor 65 into the output circuit of the amplifier.

It is the purpose of feed back resistor 65 to adjust the output of the amplifier to accurately reflect the actual torque on the engine on scale 62b of the meter relay 62. As shown, the scale has a 100% mark and variations therefrom of plus or minus 10%. The 100% mark is called the "set point" for when needle 62a of the meter relay is on this mark the engine is operating at the selected torque.

Feed back resistor 65 can be adjusted by running the engine at two different known torques in the manner described above in connection with adjusting tap 59 of potentiometer 58 and adjusting the resistor until the correct change in torque is indicated on the scale of the meter relay. The feed back resistor also can be adjusted by using the 10% calibrating mark in a manner to be described below.

There may be occasions when it will be desirable to operate an engine at some torque other than 100% of its rated torque. Therefore, in the preferred embodiment of the invention shown in FIGURE 4, means are provided whereby the set point of the meter relay, the 100% mark, can be adjusted to read 100% of something other than 100 percent of rated engine torque. This is accomplished, in the embodiment shown, by shifting $e_3$ relative to ground which changes the torque required to cause $e_3$ to indicate 100% torque on meter relay 62.

To shift $e_3$ relative to ground, a plurality of variable resistors 72a–72f are connected in parallel across lines 69 and 70 which connect a fixed resistor 66 in series with a source of constant DC voltage $E_3$. Fixed resistor 66 is also in line 64 in series with feed back resistor 65 and tap 59. A plurality of switches, 71a–71f are provided to connect each of the variable resistors 72a–72f and fixed resistor 66 to $E_3$. These switches are arranged so only one can be closed at a time. By properly adjusting each of these variable resistors $e_3$ can be shifted relative to ground a different amount of the closing of each switch to cause the set point on the meter relay to indicate different percentages of rated torque. For example, the variable resistors can be set for the different percentages of rated torque shown in FIGURE 4. Then when switch 71a is closed needle 62a of the meter relay will indicate 100% when the engine is running at 85% of rated engine torque. When switch 71f is closed, however, the meter relay will indicate 100% when the engine is running at 110% of its rated torque.

Before adjusting the set point resistors 72a–72f, they can be used to set feed back resistor 65 for the proper scale deflection of pointer 62a with changes in engine torque. First, the load on the engine is adjusted to cause the engine to operate at a predetermined actual engine torque, for example, 100% of its rated torque. The engine can be adjusted to operate at such predetermined actual torque with a Pi-meter, as described above, or in any convenient manner. Then switch 71d is closed and variable resistor 72d is adjusted until needle 62a of the meter relay is indicating zero torque. The actual torque on the engine is increased by 10% and the feed back resistor adjusted until pointer needle 62a is on the 10% calibration mark. This sets the feed back resistor so changes in the amplifier output accurately reflect changes in engine torque on the meter relay. The set point resistors 72a–72f can now be adjusted by operating the engine at various percentages of its actual rated torque and adjusting each resistor for the proper indication on the meter relay.

Further in accordance with this invention means are provided for maintaining the actual torque on an engine in a selected range. In the embodiment shown, the load, and consequently the torque, on engine 10 in FIGURE 1 can be changed by opening and closing the clearance pockets on the compressor to change the volumetric efficiency of the compressor. Each cylinder of the compressor can be provided with clearance pockets and they can be opened and closed in any desired sequence. Opening or closing one of the smallest clearance pockets is the minimum adjustment that can be made.

Assume that the compressor shown has four cylinders and that the load on the engine is to be reduced in four steps, the first step being to open two head end clearance pockets, the next to open the remaining two head end clearance pockets, the next to open all head end valve cover clearance pockets, and the last to open all rod end valve cover clearance pockets. In the embodiment shown, the clearance pockets are opened and closed by double-acting fluid pressure operated power cylinders, such as cylinders 26b, 27b, and 28b shown in FIGURE 1. Four-way valves 87, 88, and 89 control the operation of the cylinders. Where the head end pockets are to be opened in two steps, two control valves like valve 89 are required.

To open and close these clearance pockets automatically, means are provided to sense changes in engine torque and to operate one or more of the four-way valves, as required, to keep the torque in the desired range. In this embodiment, this is accomplished with the meter relay and the stepping circuit shown schematically in FIGURE 5.

To sense changes in actual engine torque, meter relay 62 is provided with two contacts 75 and 76 as shown in FIGURE 4. Each of these contacts when engaged by needle 62a, will energize portions of the stepping circuit. The contacts are located on opposite sides of the set point to provide a range within which the engine can operate without moving needle 62a into engagement with either contact. This torque range will depend on the maximum change that is intended to be made in the torque on the engine by operation of the clearance pockets. The range should be greater than this maximum, otherwise, the correction could move the needle out of engagement with one contact into engagement with the other causing the apparatus to adjust the load constantly.

The stepping circuit in FIGURE 5 includes steps A, B, C, and D, which operate solenoids 86, 95, 100, and 101, respectively, in solenoid circuit E. The solenoids operate the valves that open and close the clearance pockets on the compressor. The circuit is arranged so only one step can be actuated at a time. A time delay circuit F deenergizes each step after it has been actuated, when a predetermined period of time has elapsed, to allow the next step in the circuit to be actuated if additional changes in the load are required to move the needle 62a from one of the torque range limit contacts 75 and 76. Thus, when the torque on the engine changes sufficiently to move needle 62a of the meter relay into engagement with one of the contacts, one step in the stepping circuit will be actuated to change the load. If this change is sufficient to bring the torque on the engine back into the desired range, needle 62a will move out of engagement with the contact and the step will be deenergized. If the change is not sufficient, the time delay circuit will deenergize the circuit momentarily to allow the next step to be actuated.

The stepping circuit in the embodiment shown consists of a plurality of switching relays. The switches are shown conventionally and the relays are shown as rectangles. To simplify the description, and also the illustration of the circuitry, the relays are not shown in the conventional manner with all switches adjacent the relay that actuates them, but each relay is given a number and all switches actuated by that relay are designated by the same number followed by a lower case letter suffix. It is believed that this manner of showing the circuit makes it more easily understood.

Assume that all clearance pockets are closed and the torque on the engine increases sufficiently to move needle 62a into engagement with high torque contact 75. In FIGURE 5 the meter relay 62 is shown schematically as comprising two switches 78 and 79. Switch 78 represents high torque contact 75 and needle 62a, and switch 79 represents low torque contact 76 and needle 62a. These switches are arranged to connect relays 80 and 102 across power lines $L_1$ and $L_2$. Obviously, if all of the clearance pockets are closed, no additional increase in load can be obtained through them, so normally open switch 83e is placed between low torque switch 79 and relay 102. This switch is closed only after step A of the circuit has been actuated and at least one clearance pocket is closed.

Closing switch 78 energizes step A, the first step in the stepping circuit, which deenergizes solenoid 86 and opens two head end clearance pockets according to the predetermined arrangement. Step A is actuated by the closing of switch 80b in power line $L_1$ by relay 80, which is energized when switch 78 is closed by the increase in engine torque. Closing switch 80b energizes relay 82 that is connected across power lines $L_1$ and $L_2$ through switch 83a and lines 84, 84a, and 85. Relay 82 closes switch 82b and energizes latch-type relay 83L. This relay then opens switch 83c in the solenoid circuit, deenergizing solenoid 86, to operate valve 89 (FIGURE 1) and open two head end clearance pockets.

Relay 82, in step A, locks itself across the power lines by closing switch 82a. This also keeps relay 83L energized even though it opens switch 83a. Opening of this switch keeps this portion of the step from again being energized until the clearance pockets it opens have again been closed. Relay 83L also closes switch 83d in step B to prepare this step for actuation should a further reduction in load on the engine be required. Relay 82, however will hold switch 82c in step B open as long as step A is energized to keep both steps from being energized at the same time.

If the opening of the two head end clearance pockets does not reduce the load and the torque on the engine sufficiently to cause needle 62a of the meter relay to move out of engagement with high contact 75, time delay circuit F will prepare the stepping circuit for the actuation of the next step to further reduce the load. The time delay circuit includes switch 80a, which is closed by relay 80 when high torque switch 78 is initially closed. This energizes time delay relay 81, which will close switch 81a after a predetermined period of time. When switch 81a is closed, time drop out relay 94 is energized opening switch 94a which deenergizes relay 80, opening switch 80b, and deenergizing step A. Time drop out relay 94 then will allow switch 94a to close again after a short period of time, reenergizing relay 80, closing switch 80b and actuating step B.

The length of time required for time delay relay 81 to close switch 81a and deenergize the stepping circuit through relay 94 will depend upon the time required for changes in the torque on the engine to be reflected in the pressure in the volume chambers connected to the cylinders. This is determined by the sensitivity of the apparatus to changes in engine torque which, as explained above, is a function of the volume of the chambers and the size of the opening in the flow restrictions through which they are connected to the cylinders. The time delay circuit should wait long enough for the change in load to be reflected in the meter relay before deenergizing the stepping circuit preparatory to the next step.

If after the time delay circuit F deenergizes the stepping circuit, the torque on the engine is still above the desired amount, switch 78 will remain closed and relay 80 will again be energized when switch 94a closes. This will close switch 80b energizing relay 90 of step B through switches 82c, 83d (which is being held closed by latch relay 83L), switch 91a, and lines 92 and 93. Relay 90 closes switch 90a and 90b energizing latch relay 91L, which opens switch 91c (in section F) deenergizing solenoid 95, and opening the remaining two head end clearance pockets by operating a four-way valve similar to valve 89 of FIGURE 1.

If this reduces the load sufficiently, high torque switch 78 will open, deenergizing step B and the engine will operate with its head end clearance pockets closed until torque changes require additional adjustments in the load on the engine. If the torque is not reduced sufficiently, the time delay circuit will deenergize step B, and step C will be actuated. The clearance pocket opening portion thereof includes relay 96, and latch relay 97L, and switches 96a, 96b, 90c, 91d, and 97a. When these relays are energized they open switch 97c in the solenoid circuit, deenergizing solenoid 100 which operates four-way valve 88 (FIGURE 1) to open all of the head end valve cover clearance pockets.

If more reduction in the load is required the time delay circuit will deenergize step C and step D will be actuated. The clearance pocket opening portion of this step includes relays 98 and 99L and switches 98a, 98b, 96c, 97d, and 99a. When energized these relays will open switch 99c, deenergize solenoid 101, and operate four-way valve 87 to open all of the rod end valve cover pockets. All clearance pockets are now open so relay 99L of step D opens switch 99d between the high torque switch 78 and relay 80, deenergizing the circuit.

The clearance pocket opening portions of steps C and D operate in the same manner as does the pocket opening portion of step B described in detail above. Therefore, a detailed description of their operation will not be given.

To increase the torque on the engine the clearance pockets are closed. Assume that all pockets are open and the torque on the engine drops until needle 62a engages contact 76. This closes low torque switch 79 of FIGURE 5. Switch 83e was closed by relay 83L, when step A of the circuit closed the first group of pockets, so relay 102 is energized by the closing of switch 79. In the embodiment shown the closing of the pockets occurs in reverse order from the opening thereof, so the tripping relay 99T of step D will be actuated first. To keep the tripping portion of the other steps from also being energized, as each step is actuated to open a group of clearance pockets it opens a switch in the tripping circuit of the preceding step. Thus, step B opens switch 91e by relay 91L, relay 97T of step C opens switch 97e of step B, etc. Then as each latch relay is tripped, it will prepare the pocket closing portion of the next preceding step for actuation.

When relay 102 is energized by the closing of low torque switch 79, switch 102a in power line L₃ is closed, energizing relay 104 in step D through switch 99b (which was closed by relay 99L) and lines 105 and 106. Relay 104 closes switch 104b energizing tripping relay 99T, which releases latching relay 99L. This allows switch 99c in the solenoid circuit to close and reenergize solenoid 101, which closes the rod end valve clearance pockets to increase the torque on the engine.

If the resulting increase in torque is sufficient to open the low torque switch 79, relay 102 will be deenergized, switch 102a opened, and the stepping circuit deenergized. If the torque on the engine is still too low, time delay circuit F will deenergize the circuit preparatory to the closing of more pockets by the next step. The time delay circuit functions in the same manner as described above, however, it is actuated through switch 102b, which is closed by relay 102 when low torque switch 79 is closed. Thus, the time delay circuit opens switch 94a after a predetermined length of time, which deenergizes relay 102 and opens switch 102a. This deenergizes relays 104 and 99T of step D.

When switch 94a closes again, relay 102 will be energized again and switch 102a closed. With relay 99L of step D tripped, switch 99e is closed and relay 107 of step C will be energized through switches 104c, 99e, and 97b (which is being held closed by relay 97L), and lines 108, 108a, and 109. Relay 107 closes switches 107a and 107b locking itself across power lines L₃ and L₂ and energizing tripping relay 97T. This releases latch relay 97L, which closes switch 97c, energizes solenoid 100, and closes the head end valve cover clearance pockets.

If this increases the torque on the engine sufficiently, low torque switch 79 will open and deenergize the stepping circuit. If not, the timing circuit will deenergize the circuit and the next step will be actuated to close additional clearance pockets. This process will continue until the torque has been increased sufficiently or all of the pockets are closed. The tripping portion of step B includes relays 110 and 91T and switches 107c, 97e, 91b, 110a and 110b. The tripping portion of step A includes relays 111, and 83T, and switches 110c, 91e, 83b, 111a, and 111b. These relays and switches operate in the same manner as do their counter parts in step C and therefore a detailed description of their operation is dispensed with in the interest of simplicity.

The apparatus and method of this invention can be employed to obtain other information relative to the performance of the engine. For example, a cylinder scanner and load balance indicator 112 such as the type manufactured by the Alnor Instrument Co., a division of Illinois Testing Laboratories, Inc., Chicago, Ill. can be connected as shown to indicate if all of the cylinders are operating properly. The indicator monitors the output of each transducer. Should one of the cylinders start to misfire or detonate excessively this will be reflected in the output of the transducer associated with it and the indicator will warn the operator that the engine is not running properly. In addition, another resistor 52 can be located in the transducer circuit of FIGURE 4 to provide a voltage drop $e_6$ that will vary with MTP as does $e_1$. Since MTP is a function of the MEP of the power cylinders of the engine and also the speed of the engine, it will vary with the horsepower output of the engine. Thus, voltage $e_6$ can be used to indicate, on a properly calibrated meter, the approximate horsepower output of the engine.

The above apparatus has been described and shown in the drawings as using electrical voltages as signals. Fluid pressure signals could be used equally as well to accomplish the same result. Also any combination of pressure and electrical signals could be used, as will be understood by those skilled in the art.

From the foregoing, it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for providing a signal having a magnitude that is proportional to the actual torque on an internal combustion engine comprising means for producing a first signal having a magnitude that is proportional to the mean time pressure of the engine, and which changes in magnitude with changes in the speed of the engine and the pressure in the power cylinder of the engine; means for producing a second signal having a magnitude that is proportional to the speed of the engine, and which changes with engine speed at the same rate that the first signal changes with engine speed; means for combining the first and second signals to cause the changes in magnitude of the first signal due to changes in engine speed to be offset by the changes of equal magnitude in the second signal, to provide a third signal having a magnitude that is proportional to and changes with the actual torque on the engine.

2. Apparatus as set forth in claim 1 wherein the means for combining the first and second signals includes means for subtracting the magnitude of the second signal from the magnitude of the first signal.

3. Apparatus as set forth in claim 1 including means for producing a signal having a magnitude that is proportional to the speed of the engine, and which changes with engine speed at a greater rate than does the first signal for the same changes in engine speed; and said second signal being a portion of said last-named signal.

4. Apparatus as set forth in claim 1 wherein said third signal is a continuous signal.

5. Apparatus as set forth in claim 1 wherein said first, second and third signals are continuous signals.

6. Apparatus for producing a signal having a magnitude that is proportional to the torque on an internal combustion engine comprising
a separate pressure chamber for each power cylinder of the engine; means including a flow restriction for connecting each power cylinder to its separate pressure chamber, so that the pressure in each chamber will be proportional to the mean time pressure of the cylinder to which it is connected; means operatively associated with each pressure chamber for producing a signal having a magnitude that is proportional to the mean time pressure of the engine; means for producing a signal having a magnitude that is proportional to the speed of the engine and which changes in magnitude with changes in the engine speed at the same rate that the pressure signal changes in magnitude with changes in engine speed; means for combining the pressure signal and the speed signal to produce a third signal that has a magnitude which is unaffected by changes in engine speed and which is proportional to the actual torque on the engine.

7. Apparatus as set forth in claim 6 including means for producing a signal having a magnitude that is proportional to the speed of the engine, and which changes in magnitude with changes in engine speed at a rate greater than the pressure signal; and wherein said speed signal which is combined with said pressure signal is a portion of said last-named signal.

8. Apparatus as set forth in claim 6 wherein said pressure signal, said speed signal, and said third signal are electrical signals.

9. Apparatus as set forth in claim 7 wherein said pressure signal, said first-named speed signal, said second-named speed signal, and said third signal are electrical signals.

10. Apparatus for producing an electrical signal having a magnitude that is proportional to the actual torque on an internal combustion engine comprising means for producing a voltage drop across a first impedance that is proportional to the mean time pressure of the engine; means for producing a voltage drop across a second impedance that is proportional to engine speed that changes with speed at the same rate as does the voltage drop across the first impedance; and means for connecting the first and second impedances in reverse polarity of poles to produce a voltage drop across both impedances that is unaffected by changes in engine speed and that is proportional to the actual torque on the engine.

11. Apparatus as set forth in claim 10 including a voltage responsive indicating means; means for imposing a voltage across the indicating means that is proportional to the voltage drop across both impedances; and means for adjusting the voltage across the indicating means to cause such means to indicate the actual torque on the engine.

12. Apparatus as set forth in claim 11 wherein said indicating means includes an indicator needle movable across a scale calibrated in percent of torque; and means are provided to shift the voltage drop across the indicating means relative to ground to cause the indicating means to indicate percentages of a selected percentage of rated torque.

13. A method of indicating the actual torque on an internal combustion engine comprising producing a first signal having a magnitude that is proportional to the mean time pressure of the engine, and which changes in magnitude with both the engine speed and the pressure in the power cylinder of the engine; producing a second signal having a magnitude that is proportional to the engine speed, and which changes in magnitude with engine speed at the same rate that the first signal changes in magnitude with engine speed; and combining the first and second signals in a manner that changes in magnitude of the second signal offset changes in magnitude of the first signal due to changes in engine sped, to produce a third signal that is proportional to and changes with the pressure in the engine power cylinder and the actual torque on the engine.

14. The method set forth in claim 13 including the steps producing a signal having a magnitude that is proportional to the speed of the engine, and which changes in magnitude with changes in engine speed at a faster rate than does the first signal; and wherein a portion of said last-named signal defines said second signal which is combined with said first signal.

15. The method as set forth in claim 13 including the steps producing the third signal as a continuous signal.

16. The method as set forth in claim 13 including the steps producing the first, second and third signals as continuous signals.

References Cited

UNITED STATES PATENTS

| | | |
|---|---|---|
| 896,755 | 8/1908 | Picht. |
| 1,960,158 | 5/1934 | Lehmann. |
| 2,349,560 | 5/1944 | Reijnst. |

CHARLES A. RUEHL, *Primary Examiner.*

U.S. Cl. X.R.

73—136